United States Patent
Sato et al.

(10) Patent No.: US 12,109,785 B2
(45) Date of Patent: Oct. 8, 2024

(54) METALLIC DECORATION FILM, METALLIC INTERIOR/EXTERIOR MEMBER FOR VEHICLE, AND METALLIC MOLDED BODY

(71) Applicants: OIKE & CO., LTD., Kyoto (JP); Denka Company Limited, Tokyo (JP)

(72) Inventors: Teiko Sato, Kyoto (JP); Kota Nagaoka, Gunma (JP)

(73) Assignees: OIKE & CO., LTD., Kyoto (JP); Denka Company Limited, Tokyo (JP)

( * ) Notice: Subject to any disclaimer, the term of this patent is extended or adjusted under 35 U.S.C. 154(b) by 114 days.

(21) Appl. No.: 17/797,565

(22) PCT Filed: Jan. 18, 2021

(86) PCT No.: PCT/JP2021/001496
§ 371 (c)(1),
(2) Date: Aug. 4, 2022

(87) PCT Pub. No.: WO2021/161726
PCT Pub. Date: Aug. 19, 2021

(65) Prior Publication Data
US 2023/0054896 A1    Feb. 23, 2023

(30) Foreign Application Priority Data
Feb. 10, 2020   (JP) .................. 2020-020241

(51) Int. Cl.
| | |
|---|---|
| B32B 27/08 | (2006.01) |
| B32B 7/12 | (2006.01) |
| B32B 27/30 | (2006.01) |
| B32B 33/00 | (2006.01) |
| B32B 37/12 | (2006.01) |
| B32B 37/20 | (2006.01) |
| B60R 13/02 | (2006.01) |
| B60R 13/04 | (2006.01) |

(52) U.S. Cl.
CPC ............... *B32B 27/08* (2013.01); *B32B 7/12* (2013.01); *B32B 27/304* (2013.01); *B32B 27/308* (2013.01); *B32B 33/00* (2013.01); *B32B 37/12* (2013.01); *B32B 37/203* (2013.01); *B60R 13/02* (2013.01); *B60R 13/04* (2013.01); *B32B 2250/02* (2013.01); *B32B 2250/246* (2013.01); *B32B 2255/10* (2013.01); *B32B 2255/205* (2013.01); *B32B 2307/40* (2013.01); *B32B 2327/00* (2013.01); *B32B 2451/00* (2013.01)

(58) Field of Classification Search
None
See application file for complete search history.

(56) References Cited

U.S. PATENT DOCUMENTS

| | | | | |
|---|---|---|---|---|
| 5,132,164 | A | * | 7/1992 | Moriya ................. B32B 27/304 428/199 |
| 2001/0051255 | A1 | | 12/2001 | Fields |
| 2007/0276107 | A1 | * | 11/2007 | Wada ..................... C08F 14/08 525/190 |
| 2016/0052244 | A1 | | 2/2016 | Kuriyama et al. |
| 2020/0140636 | A1 | | 5/2020 | Nagaoka et al. |
| 2020/0230932 | A1 | | 7/2020 | Nagaoka et al. |

FOREIGN PATENT DOCUMENTS

| | | |
|---|---|---|
| CN | 105073410 A | 11/2015 |
| JP | 200070846 A | 3/2000 |
| JP | 2001315255 A | 11/2001 |
| JP | 2011079178 A | 4/2011 |
| JP | 2017159587 A | 9/2017 |
| JP | 2017185829 A | 10/2017 |
| WO | 2018221643 A1 | 12/2018 |
| WO | 2019059369 A1 | 3/2019 |

OTHER PUBLICATIONS

Machine translation of JP 2017/159587 A. (Year: 2017).*
International Search Report dated Mar. 23, 2021; International Application PCT/JP2021/001496.
Chinese Office Action dated Jan. 5, 2024; Chinese application No. 2021800059215.
Extended European Search Report dated Dec. 14, 2023; Application No. 21753190.4.

\* cited by examiner

*Primary Examiner* — Ramsey Zacharia
(74) *Attorney, Agent, or Firm* — Dinsmore & Shohl LLP

(57) ABSTRACT

Provided is a metallic decoration film, having a protective layer, an anchor layer, a metal deposition layer, and a bonding layer. The metal deposition layer comprises indium, the protective layer comprises a first mixed resin layer and a second mixed resin layer, the second mixed resin layer is provided on the anchor layer side, the first mixed resin layer comprises a vinylidene fluoride-based resin and an acrylic acid ester-based resin, the second mixed resin layer comprises a vinylidene fluoride-based resin and an acrylic acid ester-based resin, a solid content concentration ratio (% by mass) of the vinylidene fluoride-based resin to the acrylic acid ester-based resin in the first mixed resin layer is 75:25 to 60:40, and a solid content concentration ratio (% by mass) of the vinylidene fluoride-based resin to the acrylic acid ester-based resin in the second mixed resin layer is 15:85 to 60:40.

9 Claims, No Drawings

METALLIC DECORATION FILM, METALLIC INTERIOR/EXTERIOR MEMBER FOR VEHICLE, AND METALLIC MOLDED BODY

This application is the U.S. National Stage of PCT/JP2021/001496 filed on Jan. 18, 2021, which claims priority to Japanese Patent Application 2020020241 filed on Feb. 10, 2020, the entire content of both are incorporated herein by reference in their entirety.

TECHNICAL FIELD

The present invention relates to a metallic decoration film, a metallic interior/exterior member for vehicle, and a metallic molded body. More specifically, the present invention relates to a metallic decoration film, a metallic interior/exterior member for vehicle, and a metallic molded body, which have excellent adhesiveness and chemical resistance and are less likely to cause cloudiness or the like in a manufacturing process.

BACKGROUND ART

Conventionally, a metallic decoration film having an excellent designability and being applicable to various molded bodies having a curved surface has been developed. Patent Document 1 discloses a metallic decoration film having a surface protective film comprising a vinyl chloride resin or an acrylic resin.

PRIOR ART DOCUMENT

Patent Document

Patent Document 1: JP 2017-159587 A

SUMMARY OF THE INVENTION

However, the metallic decoration film described in Patent Document 1 is inferior in chemical resistance. Therefore, such a metallic decoration film is not suitable for applications requiring an excellent chemical resistance (for example, an interior/exterior member for automobile).

Here, in order to improve chemical resistance, it is conceivable to provide a fluororesin layer. However, the fluororesin layer is inferior in adhesiveness to an anchor layer of the metallic decoration film. Therefore, the anchor layer can not be deposited. Moreover, in the fluororesin layer, crystallization progresses due to heat applied during a manufacturing process of a film or in a molding process of a molded body using the film, which causes cloudiness.

The present invention has been made in view of such a conventional invention, and it is an object of the present invention to provide a metallic decoration film, a metallic interior/exterior member for vehicle, and a metallic molded body, which have excellent adhesiveness and chemical resistance and are less likely to cause cloudiness in the manufacturing process.

As a result of intensive studies, the present inventors have found that the above-described problems can be appropriately solved by providing a protective layer composed of a plurality of mixed resin layers comprising a vinylidene fluoride-based resin and an acrylic acid ester-based resin, and completed the present invention.

The metallic decoration film of the present invention for solving the above-described problems is a metallic decoration film, comprising a protective layer, an anchor layer, a metal deposition layer, and a bonding layer, wherein the metal deposition layer comprises indium, wherein the protective layer comprises a first mixed resin layer and a second mixed resin layer, wherein the second mixed resin layer is provided on the anchor layer side, wherein the first mixed resin layer comprises a vinylidene fluoride-based resin and an acrylic acid ester-based resin, wherein the second mixed resin layer comprises a vinylidene fluoride-based resin and an acrylic acid ester-based resin, wherein a solid content concentration ratio (% by mass) of the vinylidene fluoride-based resin to the acrylic acid ester-based resin in the first mixed resin layer is 75:25 to 60:40, and wherein a solid content concentration ratio (% by mass) of the vinylidene fluoride-based resin to the acrylic acid ester-based resin in the second mixed resin layer is 15:85 to 60:40.

The metallic interior/exterior member for vehicle of the present invention for solving the above-described problems is a metallic interior/exterior member for vehicle using the above-described metallic decoration film.

The metallic molded body of the present invention for solving the above-described problems is a metallic molded body using the above-described metallic decoration film.

EMBODIMENT FOR CARRYING OUT THE INVENTION

<Metallic Decoration Film>

In one embodiment of the present invention, the metallic decoration film (hereinafter, also referred to as a film) comprises a protective layer, an anchor layer, a metal deposition layer, and a bonding layer. The metal deposition layer comprises indium. The protective layer comprises a first mixed resin layer and a second mixed resin layer. The second mixed resin layer is provided on the anchor layer side. The first mixed resin layer comprises a vinylidene fluoride-based resin and an acrylic acid ester-based resin. The second mixed resin layer comprises a vinylidene fluoride-based resin and an acrylic acid ester-based resin. A solid content concentration ratio (% by mass) of the vinylidene fluoride-based resin to the acrylic acid ester-based resin in the first mixed resin layer is 75:25 to 60:40. A solid content concentration ratio (% by mass) of the vinylidene fluoride-based resin to the acrylic acid ester-based resin in the second mixed resin layer is 15:85 to 60:40. According to such a film, the protective layer is provided with a first mixed resin layer comprising a large amount of vinylidene fluoride-based resin on its surface layer. As a result, the metallic decoration film has an excellent chemical resistance. Moreover, an acrylic acid ester-based resin is mixed in the first mixed resin layer and the second mixed resin layer. As a result, although the first mixed resin layer and the second mixed resin layer comprise a fluororesin (vinylidene fluoride-based resin), these mixed resin layers are less likely to cause cloudiness or the like in the manufacturing process. Furthermore, the second mixed resin layer provided on the anchor layer side comprises an acrylic acid ester-based resin. As a result, the anchor layer can be provided on the protective layer, and the metallic decoration film has an excellent adhesiveness. Each component will be described below.

(Protective Layer)

The protective layer is a layer for protecting a surface of a film and imparting weather resistance and chemical resistance to the film. The protective layer comprises a first mixed resin layer and a second mixed resin layer.

First Mixed Resin Layer

The first mixed resin layer is a layer provided on the outermost surface of the film. The first mixed resin layer comprises a vinylidene fluoride-based resin and an acrylic acid ester-based resin.

The vinylidene fluoride-based resin is not particularly limited. By way of an example, the vinylidene fluoride-based resin includes polyvinylidene fluoride, vinylidene fluoride-6 fluoride propylene copolymer, vinylidene fluoride-6 fluoride propylene-4 ethylene fluoride copolymer, and the like. Among them, the vinylidene fluoride-based resin is preferably polyvinylidene fluoride from the viewpoints of more excellent chemical resistance and adhesiveness of a film obtained.

The acrylic acid ester-based resin is not particularly limited. By way of an example, the acrylic acid ester-based resin is a polymer having a (meth)acrylic acid ester monomer unit as a main component. The (meth)acrylic acid ester-based resin may be a homopolymer of one kind of methacrylic acid ester monomer, may be a copolymer of two or more kinds of methacrylic acid ester monomers, or may be a copolymer of one or more kinds of methacrylic acid ester monomers and a vinyl compound other than the methacrylic acid ester monomer.

The (meth)acrylic acid ester monomer is not particularly limited. By way of an example, the (meth)acrylic acid ester monomer includes methyl (meth)acrylate, ethyl (meth)acrylate, propyl (meth)acrylate, butyl (meth)acrylate, pentyl (meth)acrylate, hexyl (meth)acrylate, and the like. Moreover, an alkyl group such as a propyl group, a butyl group, a pentyl group, and a hexyl group in the (meth)acrylic acid ester monomer may be linear or branched.

The vinyl compound other than the (meth)acrylic acid ester is not particularly limited. By way of an example, the vinyl compound other than the (meth)acrylic acid ester includes styrene, ethylene, butadiene, isoprene, α-methylstyrene, acrylonitrile, acrylic acid, propylene, and the like. In this embodiment, the (meth)acrylic acid ester monomer unit constituting the (meth)acrylic acid ester-based resin is preferably one, two, or three selected from methyl methacrylate, ethyl methacrylate, and propyl methacrylate, more preferably methyl methacrylate. The (meth)acrylic acid ester-based resin contained in the first mixed resin layer of this embodiment is further preferably polymethyl methacrylate (PMMA) from the viewpoint that a film obtained has more excellent chemical resistance and adhesiveness.

The solid content concentration ratio (% by mass) of the vinylidene fluoride-based resin to the acrylic acid ester-based resin in the first mixed resin layer may be 75:25 to 60:40, preferably 73:27 to 65:35, more preferably 71:29 to 69:31. When the solid content concentration ratio (% by mass) of the vinylidene fluoride-based resin to the acrylic acid ester-based resin in the first mixed resin layer is within the above-described ranges, a film obtained may exhibit excellent chemical resistance and weather resistance. Moreover, although the vinylidene fluoride-based resin is contained at the above-described concentration ratio, the first mixed resin layer is less likely to crystallize when heat is applied in the manufacturing process of the film and is less likely to cause cloudiness or the like. Besides, in this embodiment, the solid content concentration ratio (% by mass) of the vinylidene fluoride-based resin to the acrylic acid ester-based resin is measured by 1H NMR measurement (NMR spectrometer "AVANCE III HD NanoBay 400 MHZ" manufactured by Bruker, solvent: Dimethyl sulfoxide (DMSO), measurement temperature: 70° C., cumulative number: 64 times).

A thickness of the first mixed resin layer is not particularly limited. By way of an example, the thickness of the first mixed resin layer is preferably 10 µm or more, more preferably 15 µm or more. Moreover, the thickness of the first mixed resin layer is preferably 200 µm or less, more preferably 80 µm or less, further preferably 50 µm or less. When the thickness of the first mixed resin layer is within the above-described ranges, in a case of providing a second mixed resin layer which will be described later by thermal laminating or the like, heat is easily transferred appropriately to the second mixed resin layer. As a result, the film becomes excellent in productivity.

In addition, the first mixed resin layer of this embodiment may be composed only of the vinylidene fluoride-based resin and the acrylic acid ester-based resin described above, and may comprise other components in addition to the vinylidene fluoride-based resin and the acrylic acid ester-based resin. Other components are not particularly limited. By way of an example, other components include plasticizers, lubricants, antistatic agents, anti-fog agents, drip agents, hydrophilic agents, liquid repellents, and the like. A content of these other components is not particularly limited. By way of an example, the content of other components is 0.001 to 20 parts by mass based on a total of 100 parts by mass of the vinylidene fluoride-based resin and the acrylic acid ester-based resin.

Second Mixed Resin Layer

The second mixed resin layer is a layer provided on the anchor layer side in the protective layer. The second mixed resin layer comprises a vinylidene fluoride-based resin and an acrylic acid ester-based resin.

The vinylidene fluoride-based resin is not particularly limited. By way of an example, the vinylidene fluoride-based resin may adopt the above-described vinylidene fluoride-based resin in relation to the first mixed resin layer. Among them, the vinylidene fluoride-based resin is preferably polyvinylidene fluoride from the viewpoints of more excellent chemical resistance and adhesiveness of a film obtained.

The acrylic acid ester-based resin is not particularly limited. By way of an example, the acrylic acid ester-based resin may adopt the above-described acrylic acid ester-based resin in relation to the first mixed resin layer. The acrylic acid ester-based resin is further preferably polymethyl methacrylate (PMMA) from the viewpoint that a film obtained has a more excellent chemical resistance and adhesiveness.

The solid content concentration ratio (% by mass) of the vinylidene fluoride-based resin to the acrylic acid ester-based resin in the second mixed resin layer may be 15:85 to 60:40, preferably 18:82 to 30:70, more preferably 19:81 to 21:79. When the solid content concentration ratio (% by mass) of the vinylidene fluoride-based resin to the acrylic acid ester-based resin in the second mixed resin layer is within the above-described ranges, a film obtained has an excellent adhesiveness between the protective layer and the anchor layer. Moreover, although the vinylidene fluoride-based resin is contained at the above-described concentration ratio, the second mixed resin layer is less likely to crystallize when heat is applied in the manufacturing process of the film and is less likely to cause cloudiness and the like. On the other hand, when the concentration ratio of the vinylidene fluoride-based resin is less than 15% by mass, a glass transition temperature (Tg) of a resin constituting the second mixed resin layer becomes high. As a result, in a step of applying and drying a resin solution comprising a resin constituting the anchor layer, which will be described later, it is difficult for a solvent to immerse in the surface of the second mixed resin layer, and an effect of the resin constituting the anchor layer being compatible with the resin constituting the second mixed resin layer tends to be weakened. As a result, adhesiveness between the anchor layer and the second mixed resin layer tends to decrease. When the concentration ratio of the vinylidene fluoride-based resin 15% by mass or more, the glass transition temperature (Tg) of resin constituting the second mixed resin layer becomes low. As a result, a molecular chain in the second mixed resin layer become easier to move, and in a step of applying and drying a resin solution comprising a resin constituting the anchor layer, it becomes easy for a solvent to immerse in the surface of the second mixed resin layer, and the effect of the resin constituting the anchor layer being compatible with the resin constituting the second mixed resin layer tends to be improved. As a result, adhesiveness between the anchor layer and the second mixed resin layer tends to improve. Moreover, when the concentration ratio of the vinylidene fluoride-based resin exceeds 60% by mass, affinity between the resin constituting the anchor layer and the resin constituting the second mixed resin layer tends to decrease, and adhesiveness between the anchor layer and the second mixed resin layer tends to decrease.

A thickness of the second mixed resin layer is not particularly limited. By way of an example, the thickness of the second mixed resin layer is preferably 10 μm or more, more preferably 12 μm or more. Moreover, the thickness of the second mixed resin layer is preferably 80 μm or less, more preferably 50 μm or less. When the thickness of the second mixed resin layer is within the above-described ranges, in a case where the second mixed resin layer is laminated with the first mixed resin layer by thermal laminating or the like, heat is easily transferred appropriately to the second mixed resin layer. As a result, the film becomes excellent in productivity.

The second mixed resin layer preferably comprises an ultraviolet absorber. The ultraviolet absorber is not particularly limited. By way of an example, the ultraviolet absorber includes a triazine-based compound, a benzotriazole-based compound, a benzophenone-based compound, a hydroquinone-based compound, a cyanoacrylate-based compound, an oxalic acid-based compound, a hindered amine-based compound, a salicylic acid derivative, and the like. Among them, the ultraviolet absorber is preferably a triazine-based compound or a benzotriazole-based compound. When the second mixed resin layer comprises the ultraviolet absorber, ultraviolet rays radiated from the outside are easily absorbed with the ultraviolet absorber contained in the second mixed resin layer. This allows for the anchor layer to become less likely to deteriorate. As a result, the film becomes more excellent in weather resistance.

The triazine-based compound is not particularly limited. By way of an example, the triazine-based compound includes 2-[4,6-bis(1,1'-biphenyl-4-yl)-1,3,5-triazine-2-yl]-5-[(2-Ethylhexyl)oxy]phenol, 2-(4,6-diphenyl-1,3,5-triazine-2-yl)-5-[2-(2-ethylhexanoyloxy)ethoxy]phenol, 2-(4,6-diphenyl-1,3,5-triazine-2-yl)-5-[(hexyl)oxy]phenol, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, and 2,4-bis(2,4-dimethylphenyl)-6-(2-hydroxy-4-iso-octyloxyphenyl)-s-triazine, and modified products, polymers, and derivatives thereof, and the like. Among them, the ultraviolet absorber preferably comprises 2-[4,6-bis(1,1'-biphenyl-4-yl)-1,3,5-triazine-2-yl]-5-[(2-ethylhexyl)oxy]phenol.

The benzotriazole-based compound is not particularly limited. By way of an example, the benzotriazole-based compound includes 2-(2'-hydroxy-3'-tert-butyl-5'-methylphenyl)-5-chlorobenzotriazole, 2-(2H-benzotriazole-2-yl)-4,6-bis(1-methyl-1-phenylethyl)phenol, 2-(5'-methyl-2'-hydroxyphenyl)benzotriazole, 2-(5'-t-butyl-2'-hydroxyphenyl)benzotriazole, 2-[2'-hydroxy-3',5'-bis(α,α-dimethylbenzyl)phenyl]benzotriazole, 2-(3',5'-di-t-butyl-2'-hydroxyphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(3',5'-di-t-amyl-2'-hydroxyphenyl)benzotriazole, 2-[3'-(3",4",5",6"-tetrahydro-phthalimidemethyl)-5'-methyl-2'-hydroxyphenyl]benzotriazole, and 2,2'-methylenebis[4-(1,1,3,3-tetramethylbutyl)-6-(2H-benzotriazole-2-yl)phenol], and modified products, polymers, and derivatives thereof, and the like. Among them, the ultraviolet absorber preferably comprises 2-(2H-benzotriazole-2-yl)-4,6-bis(1-methyl-1-phenylethyl)phenol.

When the ultraviolet absorber is comprised, a content of the ultraviolet absorber is not particularly limited. By way of an example, the content of the ultraviolet absorber is preferably 0.1 parts by mass or more, more preferably 0.5 parts by mass or more, based on 100 parts by mass of the resin component (particularly, 100 parts by mass of a total amount of the vinylidene fluoride-based resin and the acrylic acid ester-based resin). Moreover, the content of the ultraviolet absorber is preferably 10 parts by mass or less, more preferably 8 parts by mass or less, based on 100 parts by mass of the resin component (particularly, 100 parts by mass of the total amount of the vinylidene fluoride-based resin and the acrylic acid ester-based resin). When the content of the ultraviolet absorber is within the above-described ranges, a sufficient ultraviolet absorbing effect is easily obtained. The weather resistance of the film easily improves. Furthermore, the ultraviolet absorber is less likely to bleed out, and the adhesiveness between the protective layer and the anchor layer is less likely to decrease.

Moreover, the second mixed resin layer may comprise a filler. When it comprises a filler, the film can express a satin-like appearance. The filler is not particularly limited. By way of an example, the filler includes an acryl-based fine particle, a styrene-based fine particle, an acrylonitrile-based fine particle, an urethane-based fine particle, a nylon-based fine particle, a polyimide-based fine particle, a melamine-based fine particle, a silicon-based fine particle, a silica-based fine particle, a zirconia-based fine particle, and the like. Among them, the second mixed resin layer preferably comprises a cross-linked acryl-based fine particle. The cross-linked acryl-based fine particle is not particularly limited. By way of an example, the cross-linked acryl-based fine particle includes a cross-linked polymethyl methacrylate fine particle, a cross-linked polyethyl methacrylate fine particle, a cross-linked polynormal butyl methacrylate fine particle, and the like. Among them, the cross-linked acryl-based fine particle preferably includes a cross-linked polymethyl methacrylate fine particle from the viewpoint of a small difference in refractive index from the second mixed resin layer.

When the second mixed resin layer comprises a cross-linked acryl-based fine particle, cloudiness of the film is easily suppressed. More specifically, in a case that the film is of a satin-like, in trying to achieve satin-like with a filler, when fine particles other than the acryl-based fine particle are used, a difference in refractive index from the second mixed resin layer becomes large, which therefore easily causes cloudiness. On the other hand, when the second mixed resin layer comprises a cross-linked acryl-based fine particle, the film is less likely to cause cloudiness and may exhibit an excellent satin-like appearance.

Besides, the cross-linked acryl-based fine particle is an acryl-based fine particle having a cross-linked structure in a molecule, specifically, an acryl-based fine particle having a cross-linked structure generated by copolymerizing an acryl-based monomer and a monomer having two or more acrylic groups. Such a cross-linked acryl-based fine particle is easily maintained without being compatible with a film due to its cross-linked structure even when heat is applied during manufacturing of the film. By leaving the cross-linked acryl-based fine particle in the final film in this way, a satin-like appearance is expressed and cloudiness may be sufficiently suppressed.

When the cross-linked acryl-based fine particle is comprised, a content of the cross-linked acryl-based fine particle is not particularly limited. By way of an example, the content of the cross-linked acryl-based fine particle is preferably 0.1 parts by mass or more, more preferably 1 part by mass or more, based on 100 parts by mass of the resin component (particularly, 100 parts by mass of the total amount of the vinylidene fluoride-based resin and the acrylic acid ester-based resin). Moreover, the content of the cross-linked acryl-based fine particle is preferably 10 parts by mass or less, more preferably 5 parts by mass or less, based on 100 parts by mass of the resin component (particularly, 100 parts by mass of the total amount of the vinylidene fluoride-based resin and the acrylic acid ester-based resin). When the content of the cross-linked acryl-based fine particle is within the above-described ranges, cloudiness of a film obtained may be sufficiently suppressed even when the film has a satin-like appearance.

Besides, the second mixed resin layer of this embodiment may be composed only of the vinylidene fluoride-based resin and the acrylic acid ester-based resin described above, may appropriately comprise the ultraviolet absorber and the cross-linked acryl-based fine particle described above, and may comprise other components. Other components are not particularly limited. By way of an example, other components are those described above in relation to the first mixed resin layer.

A method of producing a protective layer is not particularly limited. By way of an example, the protective layer may be produced by a method of laminating the first mixed resin layer and the second mixed resin layer described above by a co-extrusion method. As the co-extrusion method, a known method may be used. According to the co-extrusion method, a resin forming the first mixed resin layer and a resin forming the second mixed resin layer may be melt-kneaded by separate extruders, respectively, and united in a mold, and then the united product may be widened in width inside a T-die and extruded onto a film to produce a protective layer.

(Anchor Layer)

The anchor layer is provided for improving adhesiveness between the protective layer and the metal deposition layer.

The anchor layer is not particularly limited. By way of an example, the anchor layer may be made of a raw material having a good adhesiveness to the protective layer and a good acceptance of indium constituting the metal deposition layer, including an acryl-based resin, a nitrocellulose-based resin, a polyurethane-based resin (including those comprising a polyol resin as a main agent and in which an isocyanate-based resin is cured as a curing agent), an acrylic urethane-based resin (including those comprising an acrylic polyol resin as a main agent and in which an isocyanate-based resin is cured as a curing agent), a polyester-based resin, a styrene-maleic acid-based resin, a chlorinated PP-based resin, and the like. Among them, the anchor layer preferably comprises an acryl-based resin from the viewpoint that adhesiveness of a film obtained becomes more excellent.

The acryl-based resin is not particularly limited. By way of an example, the acryl-based resin is a resin comprising an acrylic polyol resin as a main agent and in which an isocyanate-based resin is cured as a curing agent, an ultraviolet ray-curable urethane acrylate, or the like.

A thickness of the anchor layer is not particularly limited. By way of an example, the thickness of the anchor layer is preferably 0.1 to 3 µm. When the thickness of the anchor layer is within the above-described range, the film is excellent in adhesiveness between the protective layer and the metal deposition layer.

The anchor layer may be imparted with a design property by being applied with a colorant or a metal pigment. For example, the film can express a golden appearance by being compounded with a yellow pigment as a colorant. A type and a content of the colorant can be appropriately adjusted according to a desired metallic appearance. Moreover, the anchor layer may be imparted with functionality such as an antistatic effect by being compounded with an antistatic agent or the like. Furthermore, the anchor layer may be mixed with a curing agent having an isocyanate-based resin. When it is mixed with a curing agent having an isocyanate-based resin, a film obtained can be further improved in heat resistance, weather resistance, and water resistance.

The isocyanate-based resin is not particularly limited. By way of an example, the isocyanate-based resin includes a small molecular or macromolecular aromatic and aliphatic diisocyanate, a trivalent or higher polyisocyanate, and the like. The trivalent or higher polyisocyanate is not particularly limited. By way of an example, the trivalent or higher polyisocyanate includes tetramethylene diisocyanate, hexamethylene diisocyanate, toluene diisocyanate, diphenylmethane diisocyanate, a hydrogenated diphenylmethane diisocyanate, xylylene diisocyanate, a hydrogenated xylylene diisocyanate, isophorone diisocyanate, and trimers of isocyanate compounds thereof.

A method of forming an anchor layer is not particularly limited. By way of an example, the anchor layer may be formed by applying a resin solution constituting the anchor layer, appropriately dissolved in a solvent (for example, methyl ethyl ketone, toluene, ethyl acetate, or the like), onto the protective layer using a roll coater or the like, and then drying it at about 80° C. to 100° C. for 30 seconds to 1 minute.

The resin solution of the anchor layer is applied to the second mixed resin layer of the protective layer and then dried. This causes the solvent of the resin solution to immerse in the surface of the second mixed resin layer, making the resin constituting the anchor layer compatible with the resin of the second mixed resin layer. As a result, the anchor layer and the protective layer (second mixed resin layer) may be firmly adhered to each other.

(Metal Deposition Layer)

The metal deposition layer comprises indium. It may comprise indium as oxide or nitride. When the metal deposition layer comprises indium, a film obtained is less likely to cause appearance defects such as whitening during the molding process and is excellent in molding processability. As a result, the film is easily processed into a variety of three-dimensional shapes.

Moreover, the metal deposition layer may comprise various types of non-metals, metals, metal oxides, and metal nitrides, in addition to indium. Non-metals, metals, and the like are not particularly limited. By way of an example, non-metals include amorphous carbon (DLC) and its composite, and metals and the like include metals such as gold, silver, platinum, tin, chromium, silicon, titanium, zinc, aluminum, and magnesium, and oxides and nitrides thereof.

A content of indium in the metal deposition layer is not particularly limited. By way of an example, the content of indium in the metal deposition layer is preferably 95% by mass or more, more preferably 98% by mass or more. The content of indium may be 100% by mass.

A thickness of the metal deposition layer is not particularly limited. By way of an example, the thickness of the metal deposition layer is preferably 10 nm or more, more preferably 15 nm or more. Moreover, the thickness of the metal deposition layer is preferably 80 nm or less, more preferably 60 nm or less. When the thickness of the metal deposition layer is within the above-described ranges, the metal deposition layer easily achieves both metallic luster and moldability. Moreover, a film obtained becomes able to not only increase transmittance but also reduce a transmission haze. As a result, cloudiness of a transmitted light obtained is reduced, and the transmitted light can express a good color tone.

A method of forming a metal deposition layer (deposition method) is not particularly limited. By way of an example, as the deposition method, a physical deposition method such as a vacuum deposition method, a sputtering method and an ion plating method, or a chemical deposition method, or the like, which are conventionally known methods, can be appropriately adopted. Among them, a vacuum deposition method is preferably adopted to provide a metal deposition layer because of its high productivity. As a deposition condition, a conventionally known condition can be appropriately adopted based on a desired thickness of the metal deposition layer. Besides, a metal material preferably has few impurities and has a purity of preferably 99% by mass or more, more preferably 99.5% by mass or more. Moreover, the metal material is preferably processed into a granular shape, a rod shape, a tablet shape, a wire shape, or a crucible shape to be used. As a heating method for evaporating the metal material, a well-known method can be used such as a method of putting the metal material in a crucible and performing a resistance heating or high frequency heating, a method of performing an electron beam heating, and a method of putting the metal material in a board made of ceramics such as boron nitride and directly performing a resistance heating. A crucible used for vacuum deposition is preferably made of carbon or may be a crucible made of alumina, magnesia, titania, or beryllia.

(Bonding Layer)

The bonding layer is provided for adhering the film to an adherend.

The bonding layer is not particularly limited. By way of an example, the bonding layer includes various types of bonding agents, adhesives, and Pressure Sensitive Adhesives (PSA), and the like. The bonding agent is not particularly limited. By way of an example, the bonding agent is of acrylic resin-based, urethane resin-based, urethane-modified polyester resin-based, polyester resin-based, epoxy resin-based, ethylene-vinyl acetate copolymer resin (EVA)-based, vinyl resin-based (vinyl chloride (especially, polyvinyl chloride (PVC)), vinyl acetate, a vinyl chloride/vinyl acetate copolymer resin-based, styrene-ethylene-butylene copolymer resin-based, polyvinyl alcohol resin-based, polyacrylamide resin-based, polyacrylamide resin-based, resin such as an isobutylene rubber, an isoprene rubber, a natural rubber, a SBR, a NBR, and a silicone rubber. These types of resin may be dissolved in a solvent and used in an appropriate manner, or may be used without a solvent.

The bonding layer may comprise a colorant. By compounding a colorant in the bonding layer, the color tone of the transmitted light from the light source can be adjusted. As a result, the film can be adjusted to transmit a transmitted light with a desired color tone (for example, a blue-based color tone, etc.).

The colorant is not particularly limited. The colorant may be appropriately selected in consideration of a desired color tone of a transmitted light. By way of an example, the colorant preferably comprises at least one of a blue pigment and a magenta pigment when a bluish color tone is desired. Therefore, using the colorant, the transmitted light from the light source can be adjusted to have a blue-based color tone.

The method of forming a bonding layer is not particularly limited. By way of an example, the bonding layer may be formed by applying a resin solution constituting the bonding layer appropriately dissolved in a solvent to a separator which will be described later, using a roll coater or the like, and then attaching the separator on which the bonding layer is formed to a metal deposition layer, or by applying the above-described resin solution directly onto the metal deposition layer. Moreover, as the bonding layer, a ready-made product in which a bonding layer is provided on a separator may be used. The method of forming a bonding layer can be appropriately selected according to characteristics of a bonding agent or an adhesive to be used.

A thickness of the bonding layer is not particularly limited. By way of an example, the thickness of the bonding layer is preferably 10 µm or more, more preferably 15 µm or more. The thickness of the bonding layer is preferably 60 µm or less, more preferably 55 µm or less. When the thickness of the bonding layer is within the above-described ranges, a film obtained is further excellent in appearance and bonding property at the time of bonding.

The bonding layer may be imparted with a design property by being applied with a metal pigment, besides the above-described colorant. Moreover, the bonding layer may be imparted with functionality such as an antistatic effect by being compounded with an antistatic agent or the like. Therefore, the bonding layer can improve in suitability for attachment.

The obtained film may be provided with a separator. For the film, a separator provided with a bonding layer in advance may be used, or a bonding layer may be formed on the separator and attached to be in contact with the metal deposition layer.

The separator is not particularly limited. By way of an example, the separator includes a plastic film, paper, and the like surface-coated with polyethylene terephthalate (PET), polyethylene, polypropylene, or a release agent such as a fluorine-based release agent and a long-chain alkyl acrylate-based release agent.

When the separator is released, the bonding layer is exposed. The exposed bonding layer is attached to an adherend (which will be described later) before molding.

(Adherend)

In the film of the present embodiment, an adherend (backing sheet, backer) may be provided on the bonding layer. The adherend is appropriately provided when a film insert method is adopted in manufacturing a metallic molded body which will be described later. The adherend is not particularly limited. By way of an example, the adherend may be a polymer sheet allowing for thermoforming, preferably an ABS sheet, a polyacryl-based sheet, a polypropylene sheet, a polyethylene sheet, a polycarbonate-based sheet, an A-PET sheet, a PET-G sheet, a vinyl chloride (PVC)-based sheet, a polyamide-based sheet, or the like.

A thickness of the adherend is not particularly limited. By way of an example, the thickness of the adherend is preferably 0.05 to 5 mm, more preferably 0.3 to 3 mm, from the viewpoint of moldability in compression molding and the like.

As the adherend, one subjected to a desired surface processing may be used. The surface processing is not particularly limited. By way of an example, the surface processing includes matt processing, satin processing, emboss processing, hairline processing, various patterns, and the like.

As the adherend, an adherend provided with a bonding layer in advance may be used, or a bonding layer may be formed on the adherend and attached to be in contact with the metal deposition layer.

Then, the adherend to which the laminated film of this embodiment is attached is appropriately processed into a three-dimensional shape to produce a molded product (metallic molded body). A method of molding a metallic molded body is not particularly limited. By way of an example, the molding method includes vacuum molding, TOM (Three dimension Overlay Method) molding, and the like. In TOM molding, the film is applied to an adherend prepared in advance and softened by heat to be integrally molded so as to follow the adherend. On the other hand, in vacuum forming, the film is heated by a heater and softened. Next, the heated film is pressed against a mold having a desired three-dimensional shape while being vacuum-sucked, and deformed so as to follow the shape of the three-dimensional molded product.

As described above, the metallic molded body is easily manufactured by the molding process. The above-described film is used for the metallic molded body that has been subjected to the molding process. Therefore, the metallic molded body is excellent in chemical resistance and adhesiveness. In addition, the metallic molded body is less likely to cause cloudiness when molded.

The metallic molded body is not particularly limited. By way of an example, the metallic molded body includes a metallic signboard, a metallic interior/exterior member for vehicle, a metallic home appliance, a metallic amusement product, a metallic building material, and the like. Among them, the metallic molded body is appropriately used as a metallic interior/exterior member for vehicle. The metallic interior/exterior member for vehicle is not particularly limited. By way of an example, the metallic interior/exterior member for vehicle includes instrument panel garnish and ornament, an audio panel, an auto air conditioner panel, a steering ornament, a door trim ornament, a power window switch bezel, an operation system knob, a switch and a cap or a variety of covers, a radiator grill, a pillar garnish, a back door ornament, a side mirror cover, an outer panel, a rear spoiler, an inside or outside door handle, a side visor, a wheel cover, a cowling for two-wheeled vehicle, and the like. Among them, the metallic interior/exterior member for vehicle of this embodiment is more appropriate when applied to a steering wheel, handle, or the like. That is, these metallic interior/exterior members for vehicle are frequently operated by vehicle crews. At this time, when the crew uses chemicals such as a sunscreen cream, components in such chemicals adhere to the metallic interior/exterior member for vehicle. The metallic interior/exterior member for vehicle of this embodiment is excellent in chemical resistance, and therefore it is unlikely to deteriorate and cause cloudiness and cracks and the like even when such chemicals are adhered thereto.

One embodiment of the present invention has been described above. The present invention is not particularly limited to the above-described embodiments. Besides, the above-described embodiment mainly describes an invention having the following configuration.

(1) A metallic decoration film, comprising a protective layer, an anchor layer, a metal deposition layer, and a bonding layer, wherein the metal deposition layer comprises indium, wherein the protective layer comprises a first mixed resin layer and a second mixed resin layer, wherein the second mixed resin layer is provided on the anchor layer side, wherein the first mixed resin layer comprises a vinylidene fluoride-based resin and an acrylic acid ester-based resin, wherein the second mixed resin layer comprises a vinylidene fluoride-based resin and an acrylic acid ester-based resin, wherein a solid content concentration ratio (% by mass) of the vinylidene fluoride-based resin to the acrylic acid ester-based resin in the first mixed resin layer is 75:25 to 60:40, and wherein a solid content concentration ratio (% by mass) of the vinylidene fluoride-based resin to the acrylic acid ester-based resin in the second mixed resin layer is 15:85 to 60:40.

According to such a configuration, the protective layer is provided with a first mixed resin layer comprising a large amount of vinylidene fluoride-based resin on its surface layer. As a result, the metallic decoration film has an excellent chemical resistance. Moreover, an acrylic acid ester-based resin is mixed in the first mixed resin layer and the second mixed resin layer. As a result, although the first mixed resin layer and the second mixed resin layer comprise a fluororesin (vinylidene fluoride-based resin), these mixed resin layers are less likely to cause cloudiness or the like in the manufacturing process. Furthermore, the second mixed resin layer provided on the anchor layer side comprises an acrylic acid ester-based resin. As a result, the anchor layer can be provided on the protective layer, and the metallic decoration film has an excellent adhesiveness.

(2) The metallic decoration film of (1), wherein the anchor layer comprises an acryl-based resin.

According to such a configuration, the metallic decoration film may exhibit a more excellent adhesiveness.

(3) The metallic decoration film of (1) or (2), wherein the second mixed resin layer comprises an ultraviolet absorber.

According to such a configuration, the ultraviolet absorber contained in the second mixed resin layer easily absorbs ultraviolet rays irradiated from the outside and hardly deteriorates the anchor layer. Therefore, the metallic decoration film has an excellent weather resistance.

(4) The metallic decoration film of any one of (1) to (3), wherein the second mixed resin layer comprises a cross-linked acryl-based fine particle.

According to such a configuration, the metallic decoration film may sufficiently suppress cloudiness even when it presents a satin-like appearance.

(5) The metallic decoration film of any one of (1) to (4), wherein the vinylidene fluoride-based resin is polyvinylidene fluoride, and the acrylic acid ester-based resin is methyl polymethacrylate.

According to such a configuration, the metallic decoration film is more excellent in chemical resistance and adhesiveness. Moreover, the metallic decoration film is less likely to cause cloudiness or the like in the manufacturing process.

(6) The metallic decoration film of any one of (1) to (5), wherein an adherend is provided on the bonding layer.

According to such a configuration, the metallic decoration film can form a metallic design for various adherends.

According to such a configuration, the metallic decoration film is used for the metallic interior/exterior member for vehicle. Therefore, the metallic interior/exterior member for vehicle is excellent in chemical resistance and adhesiveness. Further, the metallic interior/exterior member for vehicle is less likely to cause cloudiness when processed into various three-dimensional shapes.

(7) A metallic interior/exterior member for vehicle using a metallic decoration film according to any one of (1) to (6).

(8) A metallic molded body using a metallic decoration film according to any one of (1) to (6).

According to such a configuration, the metallic molded body is easily manufactured by the molding process. The above-described metallic decoration film is used for the metallic molded body that has been subjected to the molding process. Therefore, the metallic molded body is excellent in chemical resistance and adhesiveness. In addition, the metallic molded body is less likely to cause cloudiness when molded.

EXAMPLE

Hereinafter, the present invention will be described in more detail with reference to Examples. The present invention is not limited to these Examples. Unless otherwise limited, "%" means "% by mass", and "part" means "part by mass".

Example 1

A protective layer was prepared which consists of a first mixed resin layer (a concentration ratio (%) of polyvinylidene fluoride to polymethyl methacrylate=75:25, thickness: 13 μm) and a second mixed resin layer (a concentration ratio (%) of polyvinylidene fluoride to polymethyl methacrylate=20:80, thickness: 27 μm). Using a gravure coater, an anchor coating agent solution mixed with acrylic polyol-based coating material and an isocyanate-based coating material so as to have 1.3 μm after drying is applied to the protective layer, which was then dried at 100° C. for 1 minute to form an anchor layer. Next, a metal deposition layer was formed on the anchor layer by a vacuum deposition method so that a thickness of the metal deposition layer made of indium becomes 40 nm. A bonding layer (acrylic resin, thickness: 25 μm) was bar-coated on the metal deposition layer, and a separator was provided on the bonding layer to produce a film of Example 1.

Examples 2 to 6, Comparative Examples 1 to 6

According to the formulation shown in Table 1, a film was produced by the similar method as in Example 1 except that a concentration ratio of polyvinylidene fluoride to polymethyl methacrylate which both constitute the protective layer was adjusted.

TABLE 1

| | First mixed resin layer | | | Second mixed resin layer | | | Evaluation result | | |
|---|---|---|---|---|---|---|---|---|---|
| | PVDF | PMMA | Thickness (μm) | PVDF | PMMA | Thickness (μm) | Appearance | Chemical resistance | Adhesion N/15 mm |
| Comparative example 1 | 100 | 0 | 31 | 0 | 100 | 7 | X | ○ | 0.9 |
| Comparative example 2 | 80 | 20 | 17 | 20 | 80 | 33 | X | ○ | 3.4 |
| Example 1 | 75 | 25 | 13 | 20 | 80 | 27 | Δ | ○ | 3.4 |
| Example 2 | 70 | 30 | 13 | 20 | 80 | 27 | ○ | ○ | 3.4 |
| Example 3 | 65 | 35 | 13 | 20 | 80 | 27 | ○ | ○ | 3.4 |
| Example 4 | 60 | 40 | 13 | 20 | 80 | 27 | ○ | ○ | 3.4 |
| Comparative example 3 | 50 | 50 | 13 | 20 | 80 | 27 | ○ | Δ | 3.4 |
| Comparative example 4 | 70 | 30 | 13 | 10 | 90 | 27 | ○ | ○ | 1.1 |
| Example 5 | 70 | 30 | 13 | 30 | 70 | 27 | ○ | ○ | 2.6 |
| Example 6 | 70 | 30 | 13 | 60 | 40 | 27 | ○ | ○ | 3.8 |
| Comparative example 5 | 70 | 30 | 13 | 65 | 35 | 27 | ○ | ○ | 0.7 |
| Comparative example 6 | 70 | 30 | 13 | 70 | 30 | 27 | ○ | ○ | 1.1 |

The films obtained in Examples 1 to 6 and Comparative examples 1 to 6 were evaluated for appearance, chemical resistance, and adhesion according to the following methods. The results are shown in Table 1.

<Appearance Evaluation>

Each film was attached to an adherend (a transparent ABS sheet, thickness: 300 μm). It was heated to a sheet temperature at 140° C. using a tabletop vacuum tester (V. former, manufactured by Rayama Pack Co., Ltd.), and then molded so that a draw ratio became 120%. A metallic luster and cloudiness of the molded film (metallic molded body) were visually evaluated under outdoor sunlight.

(Evaluation Criteria)

○: The film had a metallic luster and no cloudiness.

Δ: The film had a metallic luster and slight cloudiness, which was though within a permissible range.

x: The film had no metallic luster and had cloudiness.

<Chemical Resistance>

Each film was attached to an adherend (an acrylic plate (opaque), Acrylite EX432, manufactured by Mitsubishi Chemical Corporation, thickness: 3 mm), and 0.5 g of a sunscreen cream, Neutrogena (Registered Trademark) Ultra Sheer SPF45 manufactured by Johnson & Johnson K. K. was applied to a 10 cm square area of the film, and the film was placed in a dryer whose temperature was set to be 55° C. for 4 hours. Then, Neutrogena was washed with water to be removed, and appearance of the film surface was evaluated.

(Evaluation Criteria)

○: The film had no trace of sunscreen cream application.

Δ: The film had trace of sunscreen cream application.

<Adhesion>

A vinyl chloride sheet was thermocompression-bonded on the metal deposition layer of each film at 125° C. for 2 seconds, and then cut into a width of 15 mm to produce each sample. Then, a 180-degree peeling test was performed with an autograph (AGX-50kNVD manufactured by Shimadzu Corporation) to measure an adhesion between the second mixed resin layer and the anchor layer.

As shown in Table 1, any of the films of Examples 1 to 6 did not cause cloudiness or the like, or even if they did, cloudiness was within a permissible range, and the films had an excellent metallic appearance. Moreover, the films of Examples 1 to 6 were excellent in chemical resistance and adhesion. On the other hand, the films of Comparative examples 1 and 2, in which a concentration ratio of the vinylidene fluoride-based resin in the first mixed resin layer was large, caused cloudiness and had a poor appearance. Furthermore, in the films of Comparative examples 1, 4 to 6, a concentration ratio of the acrylic acid ester-based resin in the second mixed resin layer was large, and therefore adhesion between the second mixed resin layer and the anchor layer was poor. Furthermore, the film of Comparative example 3, in which the concentration ratio of the vinylidene fluoride-based resin in the first mixed resin layer was small, was inferior in chemical resistance. In addition, in the films of Comparative examples 5 and 6, the concentration ratio of the acrylic acid ester-based resin in the second mixed resin layer was small, and therefore adhesion between the second mixed resin layer and the anchor layer was poor.

<Appearance Evaluation on Satin-Like Metallic Molded Body>

Reference Example 1

A protective layer was prepared which consists of a first mixed resin layer (a concentration ratio (%) of polyvinylidene fluoride to polymethyl methacrylate=90:10, comprising 3% by mass of "GANZPEARL GM-0105" (particle size: 2 μm) manufactured by Aica Kogyo Company, Limited, as a fine particle filler, thickness: 17 μm) and a second mixed resin layer (a concentration ratio (%) of polyvinylidene fluoride to polymethyl methacrylate=0:100, thickness: 33 μm). Using a gravure coater, an anchor coating agent solution mixed with acrylic polyol-based coating material and an isocyanate-based coating material so as to have 1.3 μm after drying is applied to the protective layer, which was then dried at 100° C. for 1 minute to form an anchor layer. Next, a metal deposition layer was formed on the anchor layer by a vacuum deposition method so that a thickness of the metal deposition layer made of indium becomes 40 nm. A bonding layer (acrylic resin, thickness: 25 μm) was bar-coated on the metal deposition layer, and a separator was provided on the bonding layer to produce a film of Reference example 1. Besides, in Reference examples, as the second mixed resin layer, one that does not comprise polyvinylidene fluoride is used so that an evaluation result for an appearance evaluation in the satin-like metallic molded body can be remarkably expressed.

Reference Examples 2 to 14

According to the formulations shown in Table 2, a film was produced by the similar method as in Reference example 1 except that presence/absence, types, particle sizes, and addition amounts of fine particles to be added to the first mixed resin layer and the second mixed resin layer were adjusted. Besides, in Table 2, among the types of fine particles, "A" is a crosslinked acryl-based fine particle manufactured by Aica Kogyo Company, Limited, and "B" is a polysiloxane fine particle manufactured by Aica Kogyo Company, Limited. Of the particle sizes, "Small" represents 2 μm and "Medium" represents 3 μm. Of the addition amounts, "Little" represents 3% by mass and "Much" represents 5% by mass.

TABLE 2

| | First mixed resin layer | | | | | Second mixed resin layer | | | | | Evaluation result |
|---|---|---|---|---|---|---|---|---|---|---|---|
| | | | | Fine particle | | | | | Fine particle | | |
| | PVDF | PMMA | Type | Particle size | Addition amount | PVDF | PMMA | Type | Particle size | Addition amount | Appearance |
| Reference example 1 | 90 | 10 | A | Small | Little | 0 | 100 | | None | | ∆ |
| Reference example 2 | 90 | 10 | A | Medium | Little | 0 | 100 | | | | ∆ |
| Reference example 3 | 90 | 10 | B | Small | Much | 0 | 100 | | | | ∆ |
| Reference example 4 | 90 | 10 | B | Medium | Much | 0 | 100 | | | | ∆ |
| Reference example 5 | 90 | 10 | | None | | 0 | 100 | A | Small | Medium | ◎ |
| Reference example 6 | 90 | 10 | | | | 0 | 100 | A | Medium | Medium | ○ |
| Reference example 7 | 90 | 10 | | | | 0 | 100 | B | Small | Medium | X X |
| Reference example 8 | 90 | 10 | | | | 0 | 100 | B | Medium | Medium | X X |
| Reference example 9 | 90 | 10 | | | | 0 | 100 | B | Small | Little | X |
| Reference example 10 | 90 | 10 | | | | 0 | 100 | B | Medium | Little | X |
| Reference example 11 | 90 | 10 | | | | 0 | 100 | B | Small | Medium | X X |
| Reference example 12 | 90 | 10 | | | | 0 | 100 | B | Medium | Medium | X X |

TABLE 2-continued

| | First mixed resin layer | | | | | Second mixed resin layer | | | | | Evaluation result Appearance |
|---|---|---|---|---|---|---|---|---|---|---|---|
| | | | Fine particle | | | | | Fine particle | | | |
| | PVDF | PMMA | Type | Particle size | Addition amount | PVDF | PMMA | Type | Particle size | Addition amount | |
| Reference example 13 | 90 | 10 | | | | 0 | 100 | B | Small | Little | X |
| Reference example 14 | 90 | 10 | | | | 0 | 100 | B | Medium | Little | X |

Appearance evaluations were performed on the films obtained in Reference examples 1 to 14 according to the following method. The results are shown in Table 2.

<Appearance Evaluation>

Each film was attached to an adherend (a transparent ABS sheet, thickness: 300 μm). It was heated to a sheet temperature at 140° C. using a tabletop vacuum tester (V. former, manufactured by Rayama Pack Co., Ltd.), and then molded so that a draw ratio became 120%. A metallic luster and cloudiness of the molded film (metallic molded body) were visually evaluated under outdoor sunlight.

(Evaluation Criteria)

⊚: The film had an equivalent appearance as a plated satin.

◯: The film had a slightly inferior metallic luster as compared with the plated satin, but had no cloudiness.

Δ: The film had an inferior metallic luster as compared with the plated satin, but had no cloudiness.

x: The film had an inferior metallic luster as compared with the plated satin, and had cloudiness.

xx: The film had an inferior metallic luster as compared with the plated satin, and had a strong cloudiness.

As shown in Table 2, the films obtained in Reference examples 5 and 6 comprised a cross-linked acryl-based fine particle as a fine particle, and as a result, could express a satin-like appearance without cloudiness or the like.

The invention claimed is:

1. A metallic decoration film comprising:
    a protective layer;
    an anchor layer;
    a metal deposition layer; and
    a bonding layer,
   wherein:
    the protective layer, the anchor layer, the metal deposition layer, and the bonding layer are arranged in the stated order;
    the metal deposition layer comprises indium;
    the protective layer comprises a first mixed resin layer and a second mixed resin layer;
    the second mixed resin layer is provided on the anchor layer side;
    the first mixed resin layer comprises a vinylidene fluoride-based resin and an acrylic acid ester-based resin;
    the second mixed resin layer comprises a vinylidene fluoride-based resin and an acrylic acid ester-based resin;
    a solid content concentration ratio (% by mass) of the vinylidene fluoride-based resin to the acrylic acid ester-based resin in the first mixed resin layer is 75:25 to 60:40;
    a solid content concentration ratio (% by mass) of the vinylidene fluoride-based resin to the acrylic acid ester-based resin in the second mixed resin layer is 15:85 to 60:40;
    the anchor layer comprises an acrylic polyol resin as a main agent and an isocyanate-based resin as a curing agent; and
    an adhesion between the second mixed resin layer and the anchor layer is from 2.6 N/15 mm to 3.8 N/15 mm, measured in accordance with a 180-degree peeling test.

2. The metallic decoration film of claim 1, wherein the anchor layer comprises an acryl-based resin.

3. The metallic decoration film of claim 1, wherein the second mixed resin layer comprises an ultraviolet absorber.

4. The metallic decoration film of claim 1, wherein the second mixed resin layer comprises a cross-linked acryl-based fine particle filler.

5. The metallic decoration film of claim 1, the vinylidene fluoride-based resin is polyvinylidene fluoride, and the acrylic acid ester-based resin is polymethyl methacrylate.

6. The metallic decoration film of claim 1, wherein an adherend is provided on the bonding layer.

7. A metallic interior/exterior member for a vehicle, the metallic interior/exterior member comprising the metallic decoration film of claim 1.

8. A metallic molded body comprising the metallic decoration film of claim 1.

9. The metallic decoration film of claim 1, wherein:
    the bonding layer is in contact with the metal deposition layer; and
    an adherend is in contact with the bonding layer on a side opposite the metal deposition layer, the adherend having a thickness from 0.3 to 3 mm.

* * * * *